United States Patent [19]
Zalesski

[11] Patent Number: 5,828,195
[45] Date of Patent: Oct. 27, 1998

[54] METHOD AND APPARATUS FOR ELECTRONIC BRAKING OF AN ELECTRIC MOTOR HAVING NO PERMANENT MAGNETS

[75] Inventor: Andrew Zalesski, Apalachin, N.Y.

[73] Assignee: Universal Instruments Corporation, Binghamton, N.Y.

[21] Appl. No.: 705,266

[22] Filed: Aug. 29, 1996

[51] Int. Cl.⁶ ...................................................... H02P 6/24
[52] U.S. Cl. .......................... 318/366; 318/273; 318/701; 318/703
[58] Field of Search ..................................... 318/138, 254, 318/261, 264, 265, 266, 273, 275, 364, 366, 375, 701, 703

[56] References Cited

U.S. PATENT DOCUMENTS

| | | |
|---|---|---|
| 2,586,095 | 2/1952 | Roters . |
| 3,046,463 | 7/1962 | Johnson . |
| 3,649,894 | 3/1972 | Yoneya . |
| 3,769,555 | 10/1973 | Dolbachian et al. ................... 318/138 |
| 3,786,329 | 1/1974 | Whited . |
| 3,832,613 | 8/1974 | Bernstein et al. . |
| 4,054,943 | 10/1977 | Mundt . |
| 4,085,355 | 4/1978 | Fradella . |
| 4,577,143 | 3/1986 | Eschrich et al. . |
| 4,625,158 | 11/1986 | Taenzer . |
| 4,707,650 | 11/1987 | Bose ....................................... 318/685 |
| 4,713,594 | 12/1987 | Bose et al. ............................. 318/685 |
| 4,767,970 | 8/1988 | Rodal . |
| 5,149,998 | 9/1992 | Wolcott . |
| 5,264,772 | 11/1993 | Bahn . |
| 5,294,874 | 3/1994 | Hessenberger et al. . |

Primary Examiner—Bentsu Ro
Attorney, Agent, or Firm—Banner & Witcoff, Ltd.

[57] ABSTRACT

Apparatus for braking either a linear or rotary electric motor having no permanent magnets comprising at least one position sensor for outputting an electrical characteristic representative of motor position and an electronic circuit for generating a pulsed control signal for controlling the braking of the motor. The electronic circuit of the present invention may be responsive to any emergency such as loss of line power, a motion controller failure, or actuation of a limit switch by a driven member.

19 Claims, 10 Drawing Sheets

METHOD AND APPARATUS FOR ELECTRONIC BRAKING OF AN ELECTRIC MOTOR HAVING NO PERMANENT MAGNETS

BACKGROUND OF THE INVENTION

1. Field of the Invention

The present invention relates to the field of dynamic brakes for electric motors, and, more particularly, to an electronic braking circuit apparatus and method for providing an electromotive braking force for an electric motor having no permanent magnets, for example, when power is interrupted to a switched reluctance motor.

2. Description of the Related Art

One of the inherent problems with utilization of electric motors having no permanent magnets is the inability to brake the motor, for example, in robotics applications when a motion controller emergency occurs or an AC line voltage is lost. More particularly, for example, linear motors used to move a beam-mounted carriage along a linear track for placement of electronic circuit components may typically be mechanically braked only by bumpers or friction-increasing devices placed at the ends of the track. If braking cannot be employed before the end stops are engaged, interference of the robotic tooling may result in major damage.

On the other hand, with an electric motor having a permanent magnet, braking is typically accomplished by shorting the motor coils, for example, through a resistor thereby applying a large load to the electromotive force generated in the motor's coils in the presence of the permanent magnets. Of course, such a solution is not possible with motors having no permanent magnets.

For example, according to U.S. Pat. No. 3,832,613, a permanent magnet motor (a sewing machine brushless DC motor) is simply controlled by a dynamic brake 162 which takes advantage of the generator action of the motor to create a reverse torque for braking. Dynamic brakes for DC motors are also described in U.S. Pat. Nos. 3,786,329 and 4,767,970.

Hysteresis motors operate to permit a residual permanent magnet effect to be developed in ferromagnetic material comprising its rotor. Consequently, according to U.S. Pat. No. 4,054,943, such motors can exhibit a self-excitation which is destructive to the motor and so its self-excitation effects should be controlled or suppressed according to the principles of its teachings. The residual magnetism of a hysteresis motor can be potentially utilized to provide less efficient braking in a similar manner to the dynamic braking of a DC motor described above. An example of a hysteresis motor braking system is provided by U.S. Pat. No. 2,586,095 and as shown in FIG. 5 thereof.

With regard to AC motors and, in particular, variable reluctance motors used in robotics applications as the present invention is intended, carefully controlling position, tracking current flow, and detecting any shorts in the system or load is known. However, efficient braking is not generally known. In a control circuit taught by U.S. Pat. No. 3,649,894, a tape recorder motor can be slowed from 19 cm. per sec. to 4.8 cm. per sec. in one second, too slow for robotics applications. Nevertheless, the principle applied is to produce or newly create a field and hence a torque acting to rotate the motor in the opposite direction to its normal operating rotation or direction thus slowing and eventually stopping motor rotation as taught by FIG. 7. Also, according to U.S. Pat. No. 4,625,158, failure modes of AC motors are generally monitored to terminate high-voltage supply to amplifiers and prevent cascade failure of circuit components.

A more modern approach to AC motor braking is taught by U.S. Pat. No. 5,149,998 described as a timed dynamic electronic braking system. This patent also describes prior art mechanical brakes employing friction surfaces to absorb the kinetic energy of a driven mass but further described the application of DC voltages to brake AC motors. According to the '998 patent invention, a DC braking current is applied for a predetermined amount of time when AC is lost or disconnected, and then, AC power is reconnected once the motor stops or reaches a desired speed.

It is also known in the art generally to apply electromagnetic elements for sensing mechanical position of a moving portion of a motor relative to a stationary portion as taught, for example, by U.S. Pat. No. 4,577,143. Other elements known generally as position encoders can be used alternatively when non-ferrous materials are used in motor or stator construction.

It can be seen from the above, however, that there exists in the art a requirement for an apparatus and method, preferably a dynamic braking circuit apparatus, for braking an electric motor having no permanent magnets to supplement the braking force provided by the internal motor friction and any driven members.

Thus, it is an object of the present invention to provide a braking apparatus for utilization in braking electric motors having no permanent magnets.

Moreover, it is an object of the present invention to provide a method of braking such a motor when emergency conditions such as the loss of line power, limit switch actuation, or motion controller failure are detected.

Furthermore, it is an object of the present invention to provide an electronic braking circuit for an electric motor which comprises a sensing circuit for sensing motor position relative to a stator, thereby controlling the delivery of pulsed DC voltage to at least one phase of the electric motor to achieve an electromotive braking force.

Also, it is an object of the present invention to provide an electronic braking circuit, in particular, an electronic circuit for more than one phase of a multi-phase motor to increase the braking force to a desired level.

SUMMARY OF THE INVENTION

The problems and failures of the prior art are solved by the principles of the present invention, an electronic braking system incorporating one or more motor position tracking sensors and a source of direct current voltage whereby the sensed position is utilized to apply a different pulsed DC voltage waveform to at least one phase of the motor for reversing and thereby braking motor movement (in the case of a linear motor) or rotation (in the case of a rotational motor).

Preferably, the source of DC power may be the output of a capacitor charged by the rectified output of an AC power supply. Moreover, the present braking circuit is preferably triggered by a number of emergencies including, for example, a motion controller failure condition, the actuation of limit switches mounted to sense the movement of driven members, or the loss of line power.

More particularly, the braking circuit of the present invention comprises a relay contact for its actuation, a position sensor, and an electronic circuit for outputting a pulsed direct current waveform signal in response to the change in the motor position for controlling at least one phase of the motor. As will be more fully described herein, an electronic circuit delivers a pulsed DC waveform for controlling selected motor phases such that the motor braking force, if all motor phases are controlled for braking, is almost 100% of the electromotive force achieved during normal movement operation. Consequently, the present braking circuit and method finds highly advantageous application in robotic pick-and-place operation and in other applications where a braking force is important during emergency conditions.

For example, in one non-permanent magnet linear motor application, wherein an electronic circuit controlling one motor phase was used for braking the linear motor, approximately 30% braking efficiency was achieved in comparison with the electromotive force provided by the normal motion controller operation. When two phases were controlled simultaneously, approximately 70% braking efficiency was achieved. Further advantages and features of the present invention will become more clear from the following detailed description

DETAILED DESCRIPTION OF THE PRESENT INVENTION

The present invention is directed to the braking of an electric motor without permanent magnets in an emergency through the generation of an electromotive force opposite to the direction of motor motion. This braking is employed in the event motor motion must rapidly cease as a result of an emergency. Examples include but are not limited to motion controller system failure, limit switch actuation, line power failure, or any other emergency event which should trigger the braking force.

Figure 9:
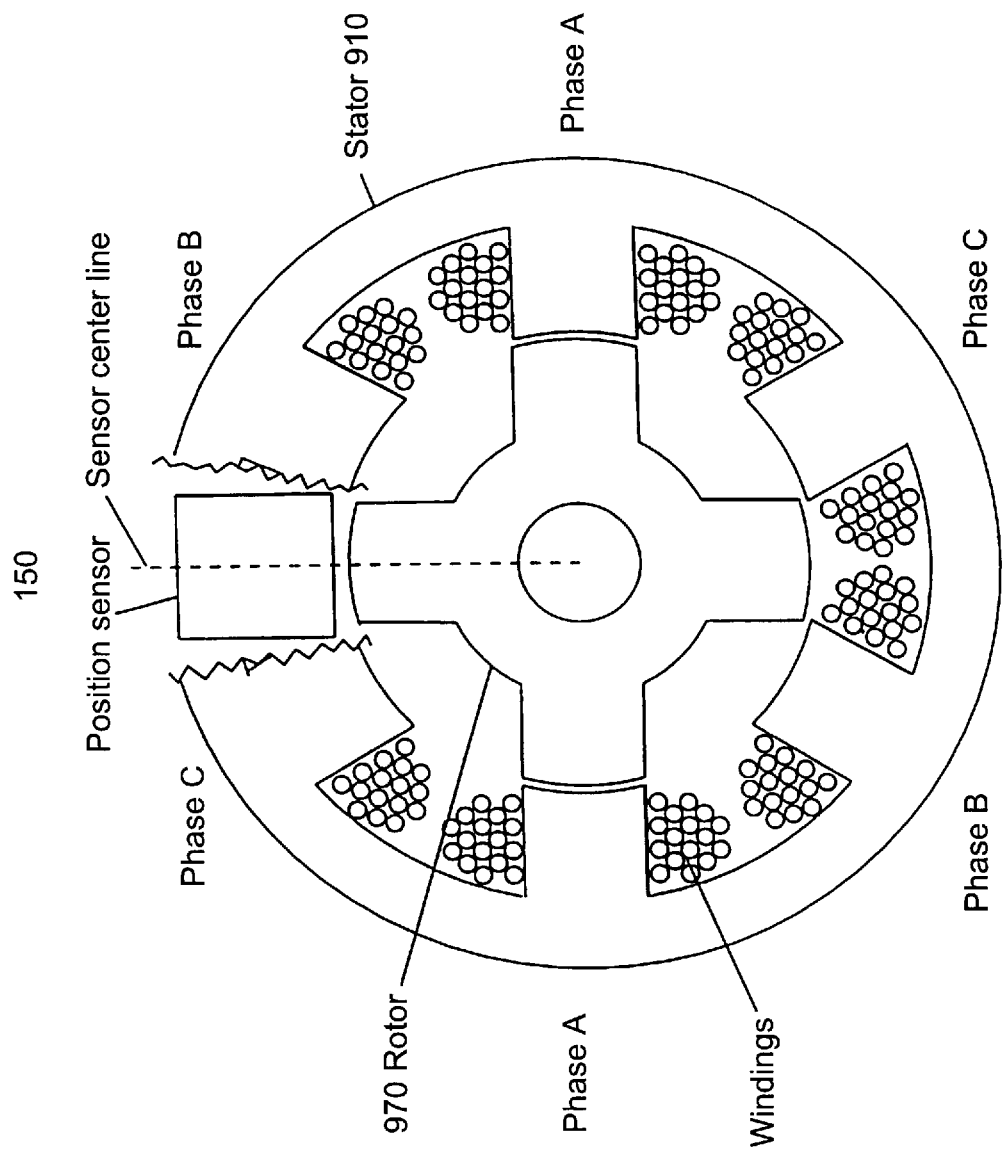
FIG. 9 is a diagram of a three-phase rotary switched reluctance motor with one position sensor, illustrating the relative placement of the position sensor with respect to the stator and armature teeth for phase A braking.
Figure 10:
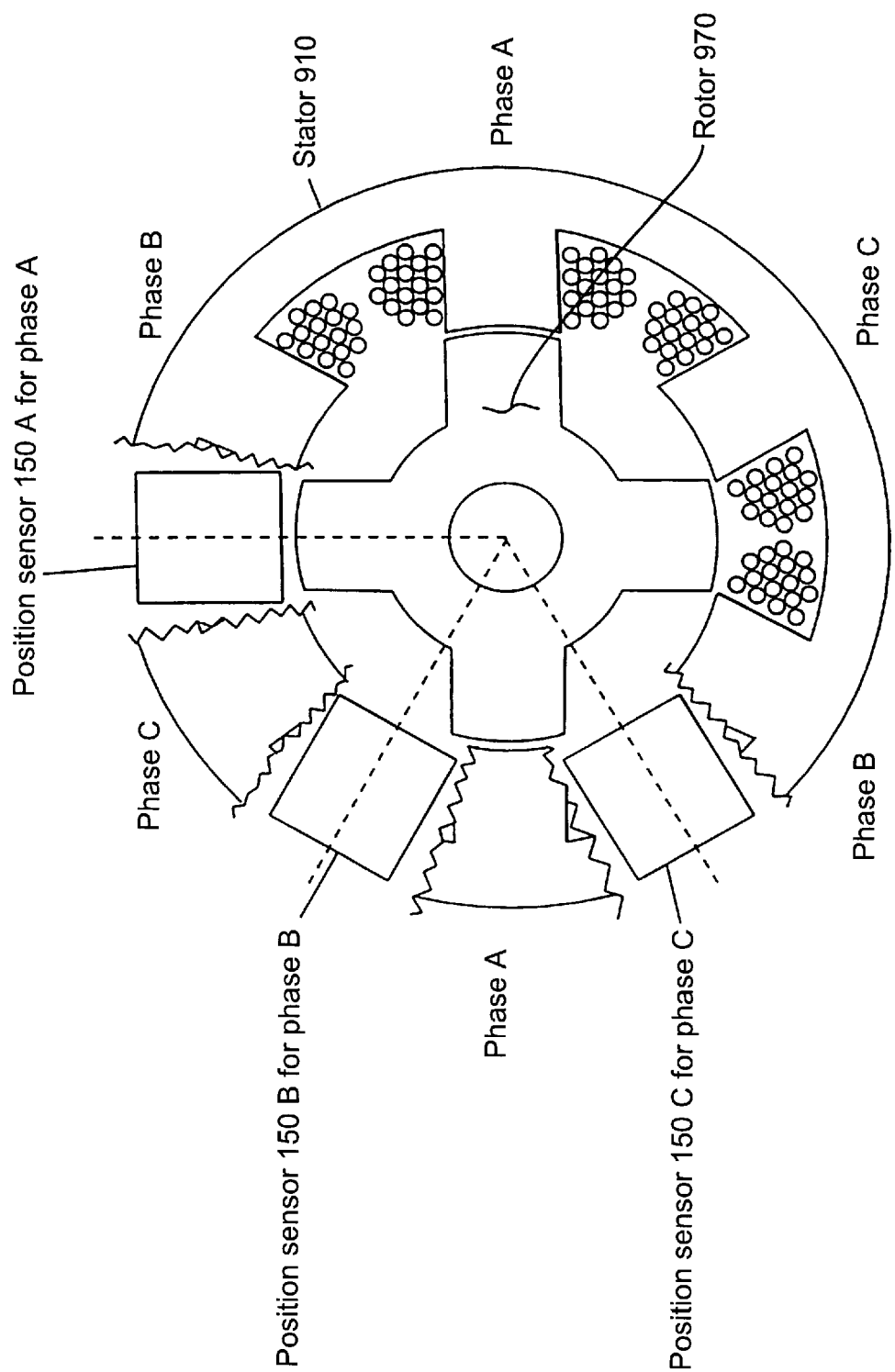
FIG. 10 is a diagram of a three-phase rotary switched reluctance motor with three position sensors, illustrating the relative placement of the position sensor with respect to the stator and armature teeth for phases A, B, and C for braking.

The present invention will be described in the context of a linear motor for moving a member from one end of a linear track to another. Such linear motors are typically utilized in robotics systems, for example, pick and place systems, in which a first linear motor moves a beam mounted to a sliding device along one axis and a second linear motor moves a carriage along the beam on an orthogonal axis so as to provide cartesian movement of a robotics end effector mounted on the carriage over a desired work area. The present invention is not limited to this use. It may also be used to brake many electric motor types which have no permanent magnets. It may also improve the efficiency of braking for motors with some permanent magnetism, for example, a hysteresis motor. The present invention also is adaptable to rotary motors as shown in FIGS. 9 and 10.

The first number of each element in a given figure represents the figure number where said element first appears. For a given element, the same element number is used in subsequent figures in which said element appears.

Figure 1:
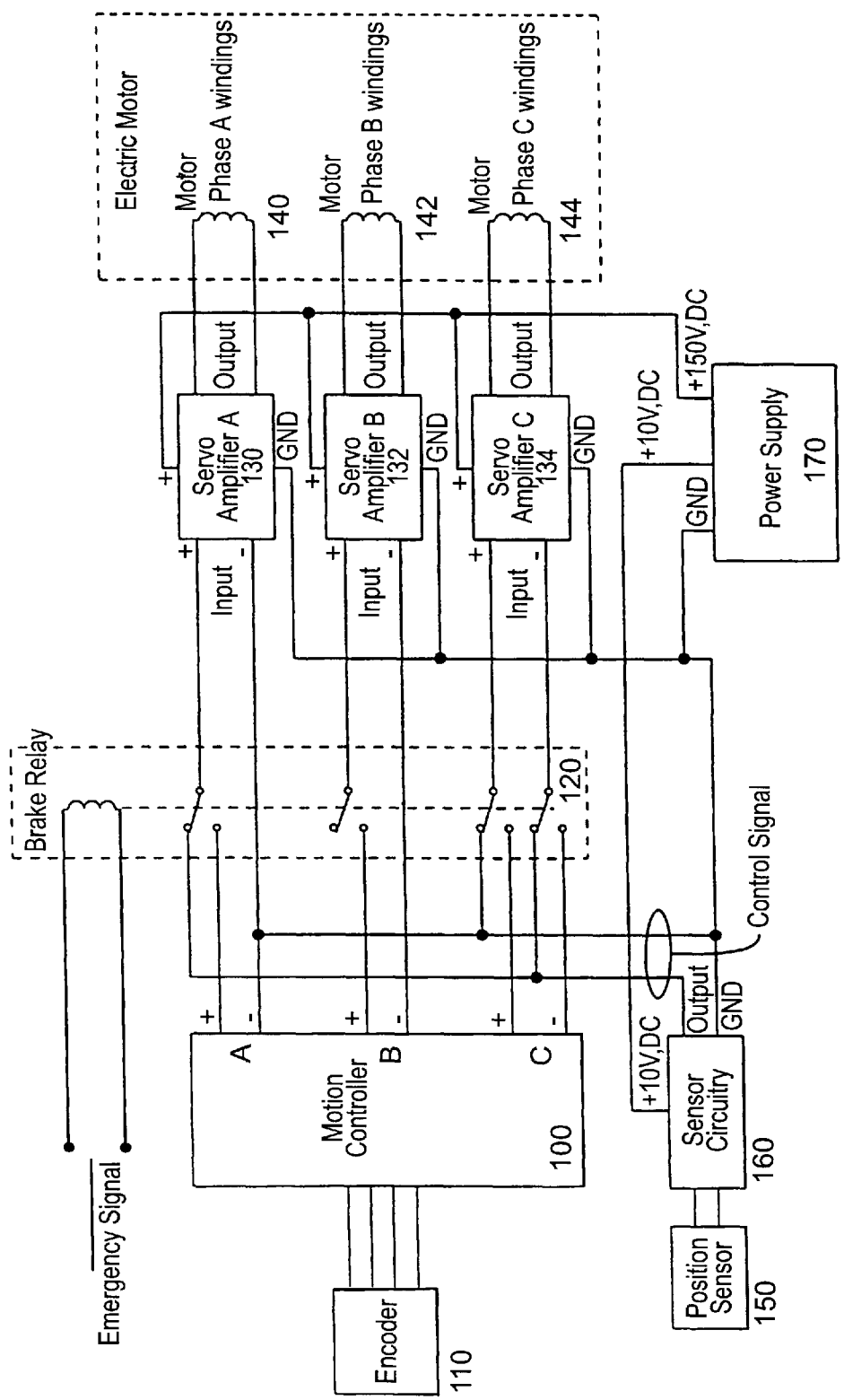
FIG. 1 is a first embodiment of a servo system for a three-phase switched reluctance coupled motor and an electronic brake circuit according to the present invention with one position sensor employing two phases, for example A and C, for emergency braking.

FIG. 1 shows a servo system controlled via a motion controller 100. The motion controller 100, using data from an encoder 110, introduces control voltages at specific times and for specific durations across output terminals to achieve a desired motor movement. These voltages activate servo amplifiers A, B, and C 130, 132, 134 which in turn drive respective motor phases A, B, and C 140, 142, 144. As depicted, each set of motion controller 100 output terminals controls a single servo amplifier which drives a single motor phase. Voltages are applied to the motor windings at different and overlapping times such that the electromotive force produced by each motor phase is appropriate in magnitude, duration, and direction, thus achieving the correct motor braking response. In the event of an emergency, such as a motion controller system failure, limit switch actuation (see FIG. 2, 230), or line power failure, a braking system is required for braking the motor. This braking system is the subject of this invention.

If there is an event which triggers an emergency signal, the brake relay 120 immediately assumes a de-energized state which switches control from the motion controller 100 to the sensor circuitry 160 to provide a control signal for braking. The braking force and motor deceleration are controlled by appropriately applying a current in the windings of selected motor phases. The brake relay 120 is shown in its de-energized state with the relay contacts connected to the sensor circuitry 160 output. Alternate forms of switching may be employed which similarly switch control from the motion controller 100 to the sensor circuitry 160. One advantage of this brake relay embodiment is that in the event of power loss due to some form of interruption, the brake relay 120 transfers control to the sensor circuitry 160 when it assumes its unpowered state.

The purpose of the sensor circuitry 160 is to introduce a current to selected motor phases via the servo amplifiers 130, 132, 134 when the brake relay is in a de-energized state, creating an electromotive force opposite the direction of travel until motor motion ceases. This is achieved by applying a source of direct current through a selected motor phase winding 140, 142, or 144 at the correct time and for the correct duration which will create an opposing electromotive force against the teeth 215 of the stator 210. The position sensor 150, in relationship to the stator 210, FIG. 2, has electrical characteristics which permit the sensor circuit 160 to generate a control signal, V3, as shown if FIG. 4, at the correct time and with the correct duration. In the preferred embodiment, motor phases A and C are shown connected to sensor circuitry 160.

Figure 2:
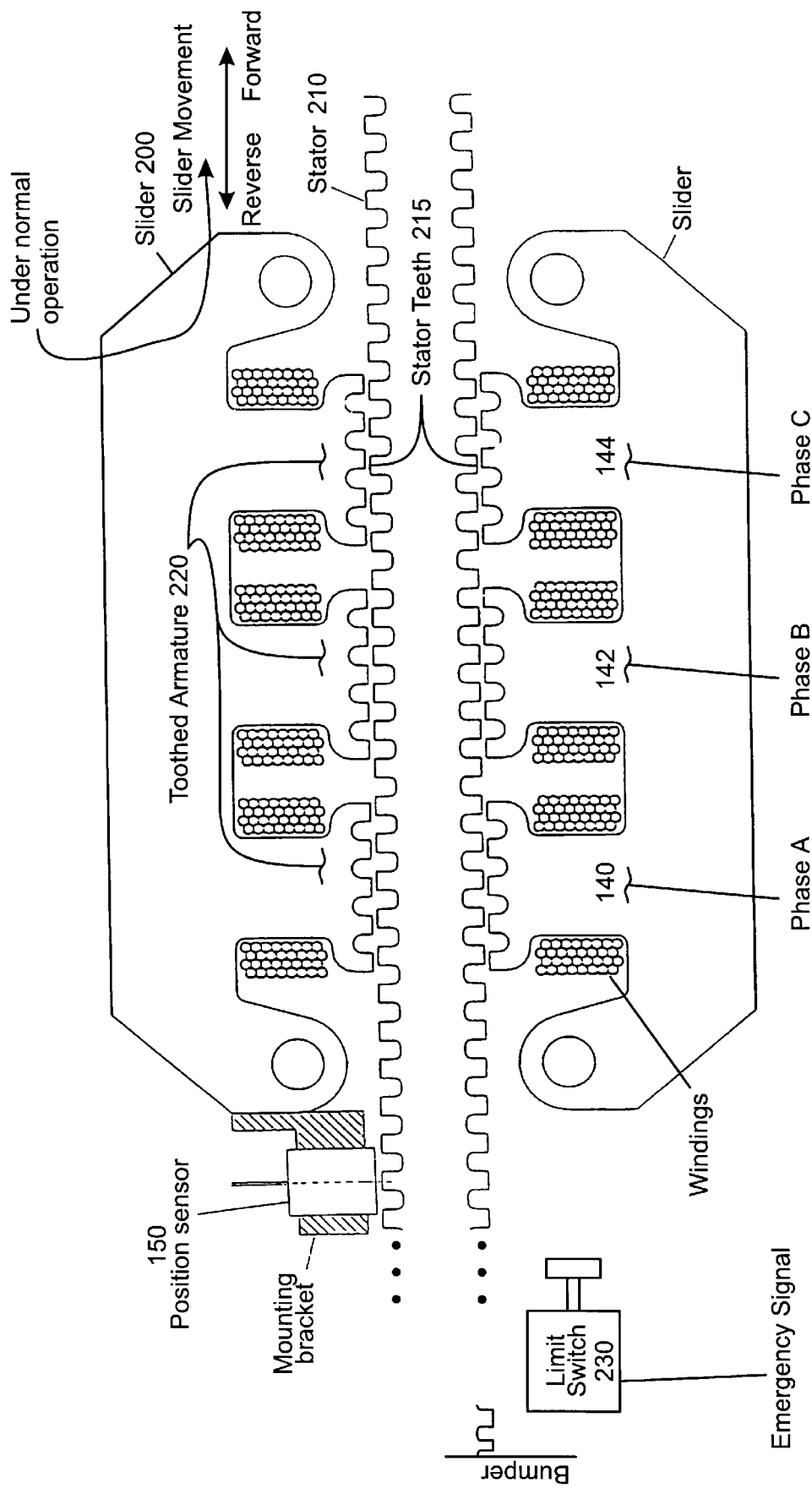
FIG. 2 is a diagram illustrating relative placement of the position sensor with respect to stator and armature teeth for a linear embodiment of the three-phase switched reluctance coupled motor shown in FIG. 1.

As shown in FIG. 2, if phase A and C are correctly energized an electromotive braking force opposite the direction of travel of a slider 200 can be produced. Since the phase A and C windings 140, 142 are connected by the same armature structure, energizing both windings with the same polarity would result in opposing magnetic fields. By applying reverse polarity to one of the phases, in this case phase C, a complimentary flux field is generated providing the maximum available electromotive braking force. The reverse polarity to phase C is accomplished by the double pole relay in the brake relay 120 shown in FIG. 1.

Returning to FIG. 1, a power supply 170 provides the necessary voltages to the sensor circuitry 160, and the servo amplifiers 130, 132, 134. The power supply may consist in part of charged capacitors which store energy from a primary line power source. The capacitors, not shown, have sufficient charge to power sensor circuit 160 and the connected servo amplifiers 130, 134 and to arrest the motor motion. Since the preferred embodiment of the brake relay 120 assumes the correct configuration upon loss of power, the power supply 170, except for its charged capacitors, is not required for brake operation in an emergency.

In development, the braking force with one motor phase controlled via a control signal generated from a single sensor was approximately thirty percent of the electromotive force of the motor during normal operations. The braking force using two phases, as shown in FIG. 1, as opposed to a single phase increased the braking force to approximately seventy percent of the available electromotive force.

FIG. 2 is a cut-away illustration of a three-phase linear switched reluctance coupled motor with a single position sensor. The position sensor 150 and the motor phase A, B, and C windings 140, 142, 144 were described in FIG. 1. Each phase comprises two windings wound on opposite sides of the stator 210. The slider 200 which houses the windings and toothed armature 220 moves linearly along the stator 210 in the forward and reverse directions as shown.

It will become evident that knowledge of the relative position and movement of the armature 220 teeth with respect to the stator teeth 215 is necessary for braking. A preferred embodiment for obtaining this information is a position sensor 150 attached to the slider 200 at a fixed distance with respect to the toothed armature 220 and with respect to the position of the stator tooth 215. Using the position sensor 150 and its relative motion with respect to a stator tooth, the electrical characteristic of the position sensor 150 determines whether it is approaching or departing from the centerline of a stator tooth. The fixed relationship between the position sensor 150 and the equi-spaced armature teeth creates a fixed geometry. As configured, the phase A and phase C motor windings 140 and 144 are energized to produce an electromotive attraction force opposite the forward direction of travel when the armature teeth of phase A and C move past the center of the stator teeth. The current applied to phase A and C is removed once the position sensor 150 reaches the center of the notch between the stator teeth.

The armature teeth associated with any given phase have the same separation or pitch as the stator teeth. The inter-phase armature tooth separation, however, is staggered by one-third of the tooth pitch such that only the teeth of one phase at a time are directly across from a set of opposing stator teeth. As shown in an instant of time, the phase A and phase C armature teeth are on opposing sides relative to the center of the opposing stator teeth 215. Due to the relative positioning of phase A and phase C teeth, phase C armature teeth are departing the center of opposing stator teeth as phase A armature teeth are approaching the center of opposing stator teeth when the slider movement is forward.

Figure 3:
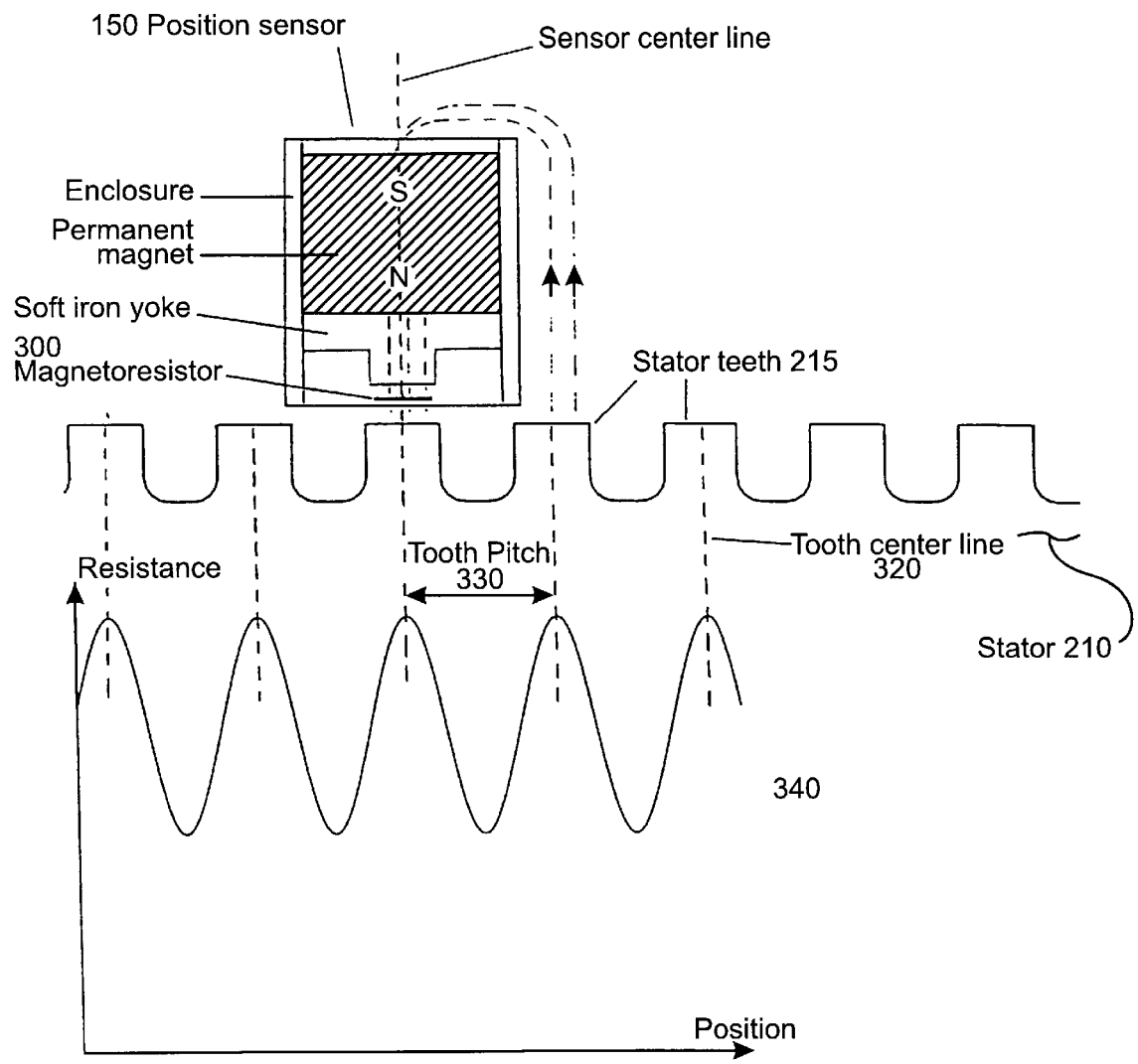
FIG. 3 is a graphical illustration of the position sensor, comprising a magnetoresistor, and the resistance variation as a function of position relative to the stator teeth.

FIG. 3 further illustrates the critical relationship of the position sensor 150 relative to the stator 210. As illustrated, the stator 210 comprises a plurality of teeth, of which only one tooth centerline 320 is labeled. Each stator tooth location along the length of the stator 210 is defined by an equally spaced tooth pitch 330. The resistance of the magnetoresistor 300 varies in relation to the stator tooth centerline 320 as shown by a graph 340.

There are various types of sensors which can be used to sense relative motor position such as optical, inductive, magnetoresistive and others. Each type of sensor requires specific circuitry to generate a control signal required to control the servo amplifiers used in a particular servo system. The preferred position sensor 150 embodiment uses a magnetoresistor 300 as a sensing devise. The magnetoresistor is built into a housing together with a permanent magnet which supplies a biasing magnetic field. The resistance of the magnetoresistor will change with the variation of the magnetic induction caused by passing a stator tooth in close proximity with the sensor. The magnetoresistor resistance is directly related to its location relative to a stator tooth center line 320. As the slider 200 of FIG. 2 moves along the stator 210, the resistance of the magnetoresistor varies with position as illustrated by the graph 340. The magnitude of the resistance is dependant upon relative position only, not velocity. The maximum resistance occurs when the position sensor 150 and an opposing stator tooth center line are aligned. The minimum resistance occurs when the position sensor has traveled one half tooth pitch in either direction.

Figure 4:
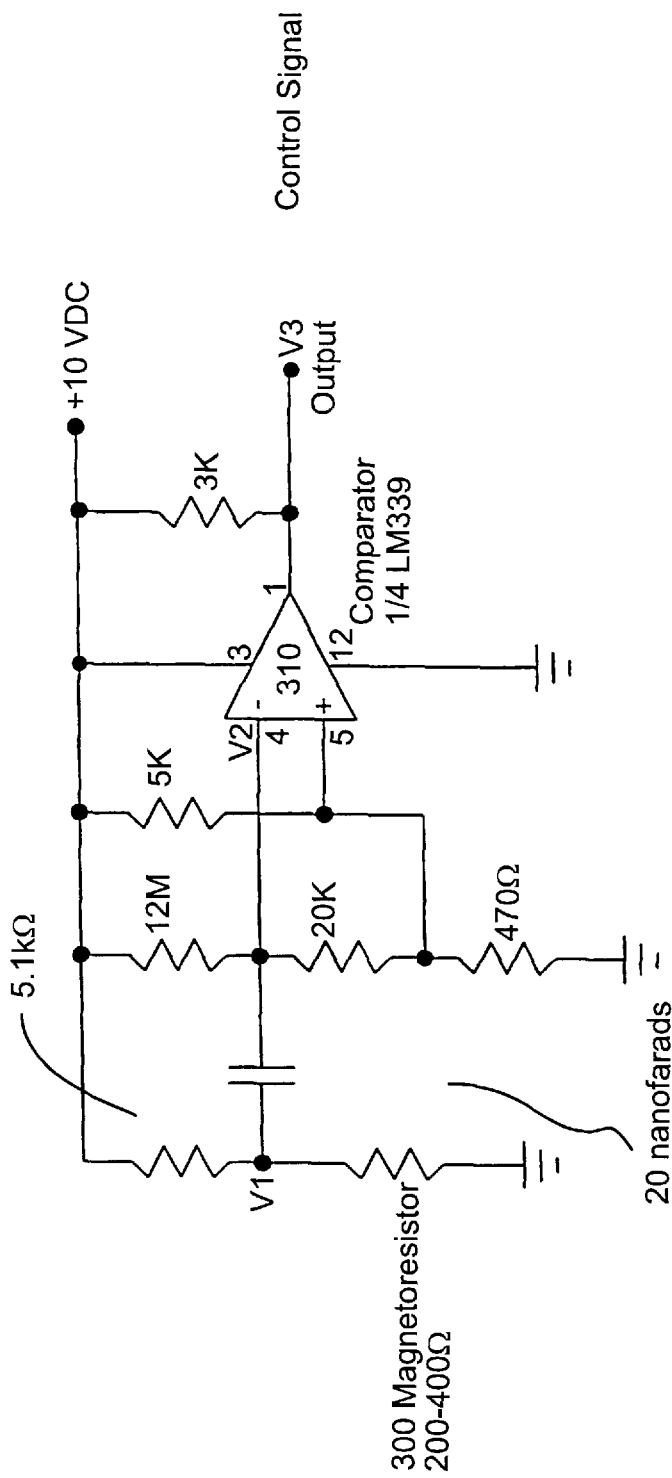
FIG. 4 is a sensor circuit of the electronic brake circuit of the present invention for outputting a stepped voltage response as a function of varying magnetoresistor resistance for braking a switched reluctance motor.

FIG. 4 illustrates a preferred electronic circuit using the electrical resistance characteristic of the magnetoresistor, illustrated in FIG. 3, for providing a control signal at the correct time and for the correct duration to provide an effective electromotive braking force. The preferred embodiment, a differentiating circuit with an inverting comparator, provides the desired control signal in the form of a stepped voltage response, V3. As the position sensor 150 containing the magnetoresistor 300 moves along the stator 210, the varying magnetoresistor 300 resistance creates a position varying voltage V1. The depicted RC network creates a voltage V2 which is proportional to the time derivative of voltage V1. Hence, when the resistance of the magnetoresistor 300 is changing the slider is moving, voltage V2 is changing. As configured, a comparator 310 provides a positive output voltage, V3, when the voltage V2 is less than a reference voltage at terminal 5. Therefore, the voltage V3 rises when the position sensor departs from a stator tooth center line until it has traveled a distance equal to half a stator tooth pitch; voltage V3 lowers as the position sensor center line approaches the stator tooth center line of the closest stator tooth as shown in FIG. 5.

When the resistance of the magnetoresistor is constant (the slider is at rest), voltage V1 is constant. Voltage V2 at terminal 4 of the comparator exceeds the voltage at terminal 5 of the comparator and voltage V3, the output of the comparator 310, approaches zero. Therefore, as the slider is braked to a rest due to the electromotive braking force, the voltage commanding the force as derived from the magnetoresistor is turned off by the electrical characteristics of the sensor circuitry.

The illustrated magnetoresistor sensor circuitry shows exemplary values only. The circuit configuration represents only one technique for obtaining the desired relationship between relative position and the generation of a control signal for braking a switched reluctance motor. The Siemens FL 210L 100-22 is a suitable magnetoresistor. As configured, the magnetoresistor resistance variation may range from, for example, 200 to 400 ohms. The comparator as illustrated is a LM 339 available from National Semiconductor Corporation. The braking control signal, V3, may be suitably amplified, as shown in FIG. 1, by a series 400 servo amplifier (for example, model 432 depending on the controlled motor) available from Copley Controls Corporation.

Figure 5:
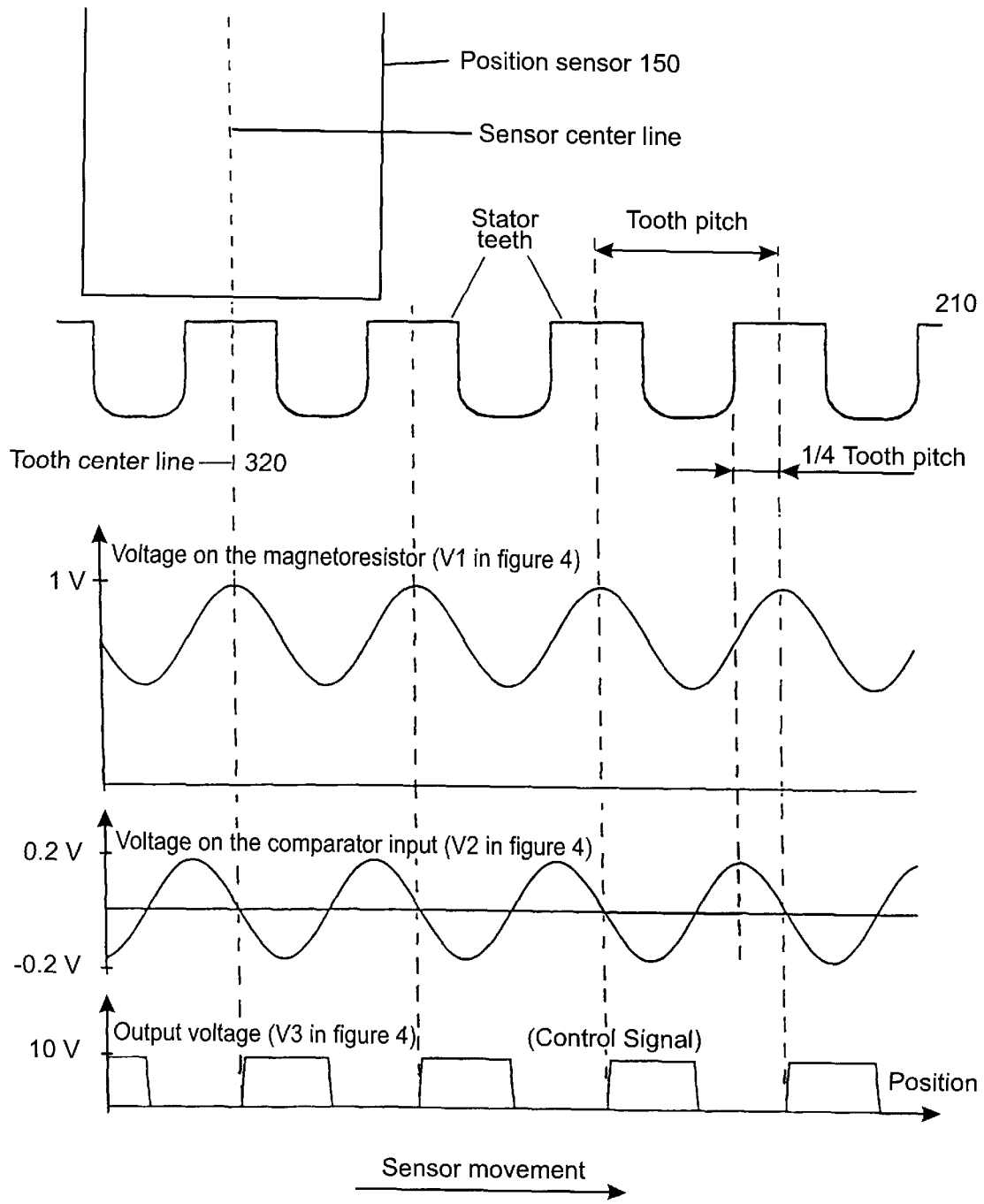
FIG. 5 is a graphical illustration of voltages from FIG. 4 showing their relationship to the stator teeth centerlines.

FIG. 5 provides a graphical illustration of the voltages V1, V2, V3 from FIG. 4 as a function of sensor 150 position relative to the stator teeth when the slider 200 is moving at constant velocity. Comparing the resistance variation of the magnetoresistor as shown in FIG. 3 with the voltage V1, it is evident that both the voltage V1 and the resistance peak when the sensor center line and the stator tooth center line are coincident. The voltage V2 is illustrated for a slider which is moving at constant velocity from left to right. Since position sensor center line and stator tooth center line alignment establishes the peak local voltage of V1, the time derivative of V1, voltage V2, necessarily must be negative after the sensor passes the tooth center line until the slider has traveled one half tooth pitch. At that position voltage V1 will begin to increase which causes voltage V2 to cross from a negative to a positive voltage. Applying V2 to the inverting comparator 310 of FIG. 4 creates a stepped voltage pulse with a leading edge as V2 becomes negative which corresponds to the position sensor passing a stator tooth center line. The trailing edge occurs when the slider has traveled a half tooth pitch. Thus, by correctly locating a position sensor with respect to the center line of the armature teeth of a selected motor phase, it is possible to energize the phase windings to provide an electromotive force opposing the direction of motion.

Figure 6:
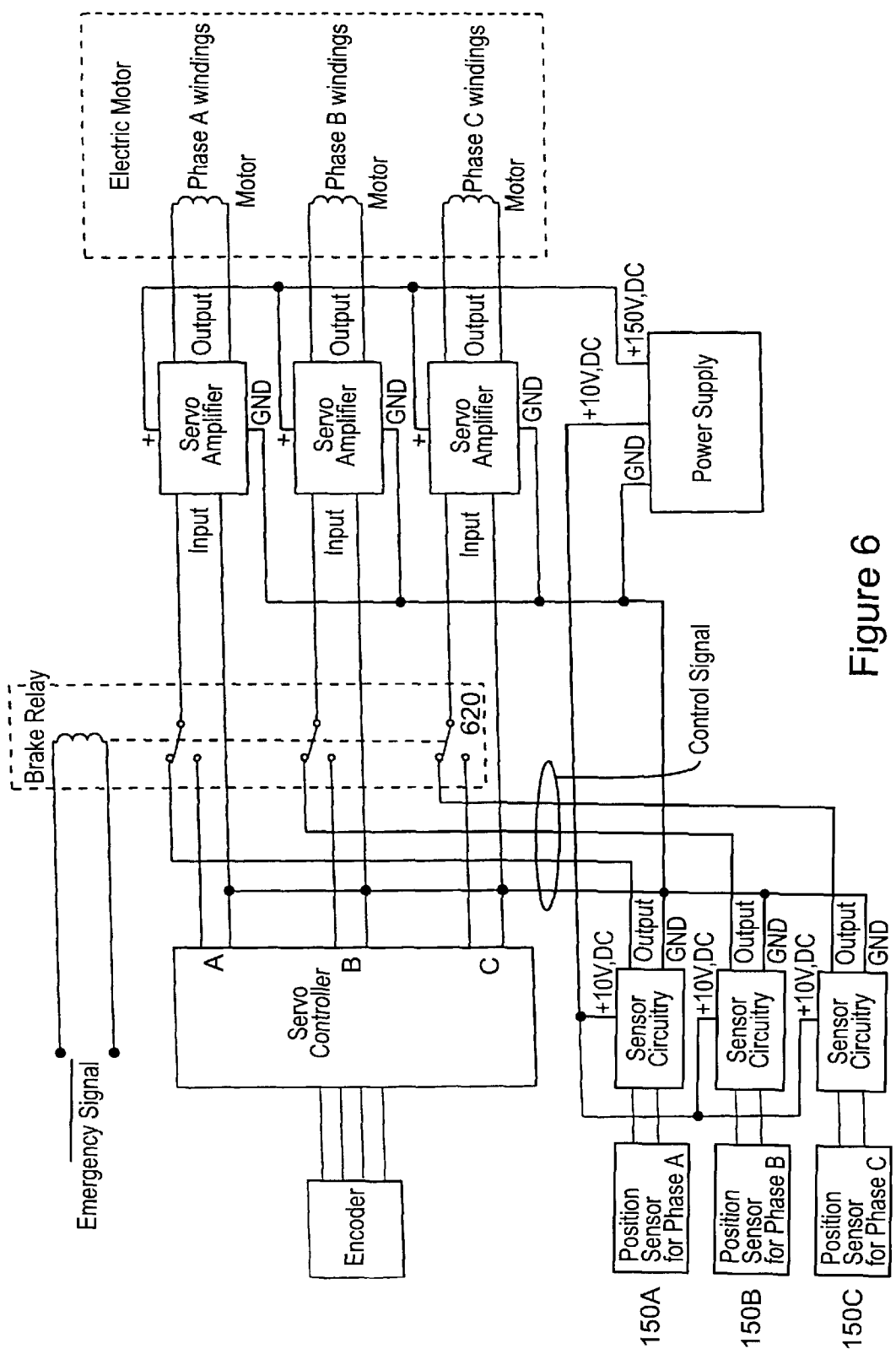
FIG. 6 is second embodiment of a servo system for a three-phase switched reluctance uncoupled motor and an electronic brake circuit according to the present invention with three position sensors employing all three phases for braking.

FIG. 6 is a different embodiment of the same invention. It differs from FIG. 1 only in the sense that instead of energizing two phase windings simultaneously to provide a braking force in response to a single position sensor, position sensors 150A, 150B, 150C corresponding to motor phases A, B, and C generate a control signal used to provide braking forces in each motor phase winding in a coordinated sequence. The brake relay 620 is modified such that the phase C winding is no longer energized with reverse polarity with respect to the phase A winding, but is energized with the same polarity as phase A as directed by its corresponding position sensor 150C.

Figure 7:
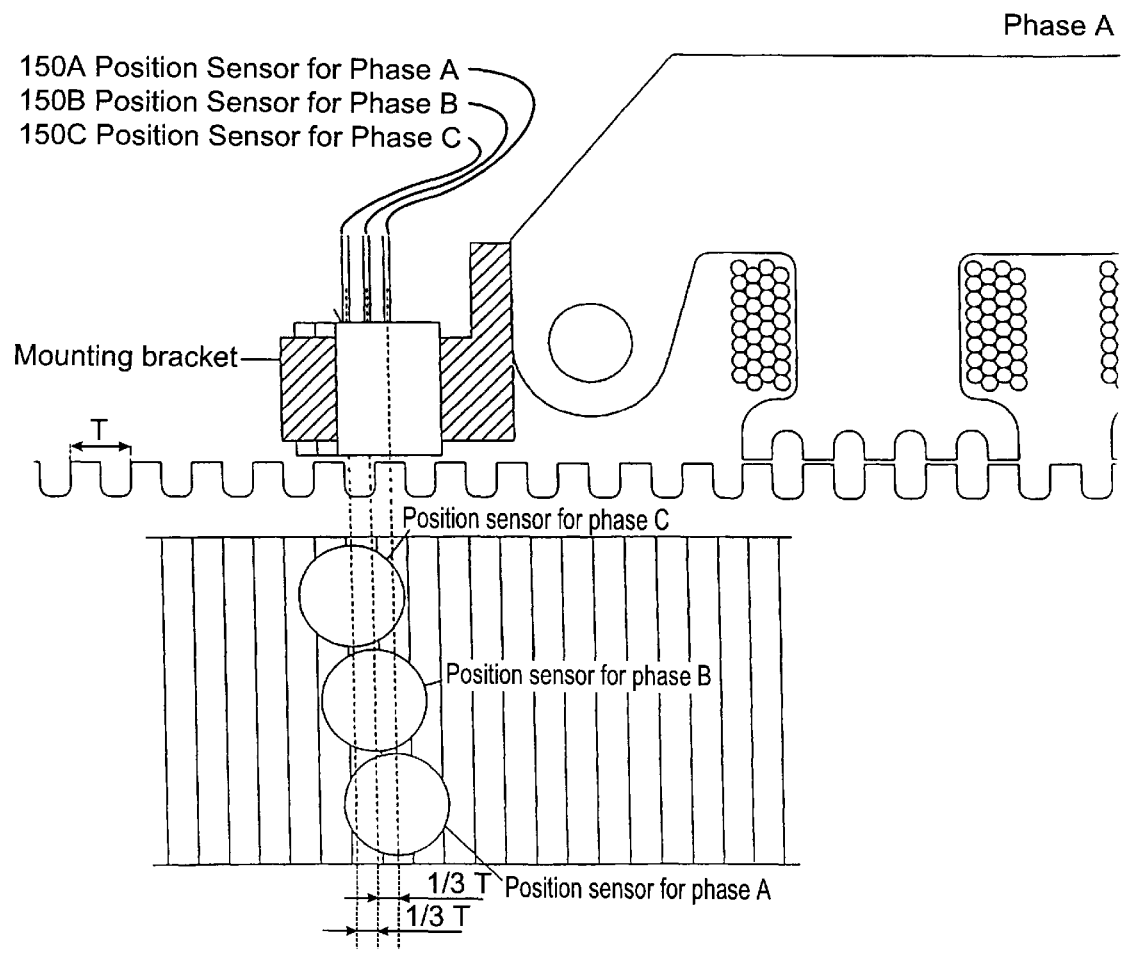
FIG. 7 illustrates a relative positioning of the three position sensors, in FIG. 6, in relationship to the stator teeth.

FIG. 7 provides an expanded cut-away view of the relative locations of the position sensors 150A, 150B, 150C. They are spaced at intervals of one third of a stator tooth pitch. This correlates to the inter-phase armature tooth spacing. Armature teeth of a given phase have centers which are spaced at distances of (N+⅓) tooth pitch from teeth centerlines in the adjacent phases. Consequently, behavior of each winding as directed by its corresponding position sensor is the same for each phase given the same position and movement relative to a stator tooth center line.

Figure 8:
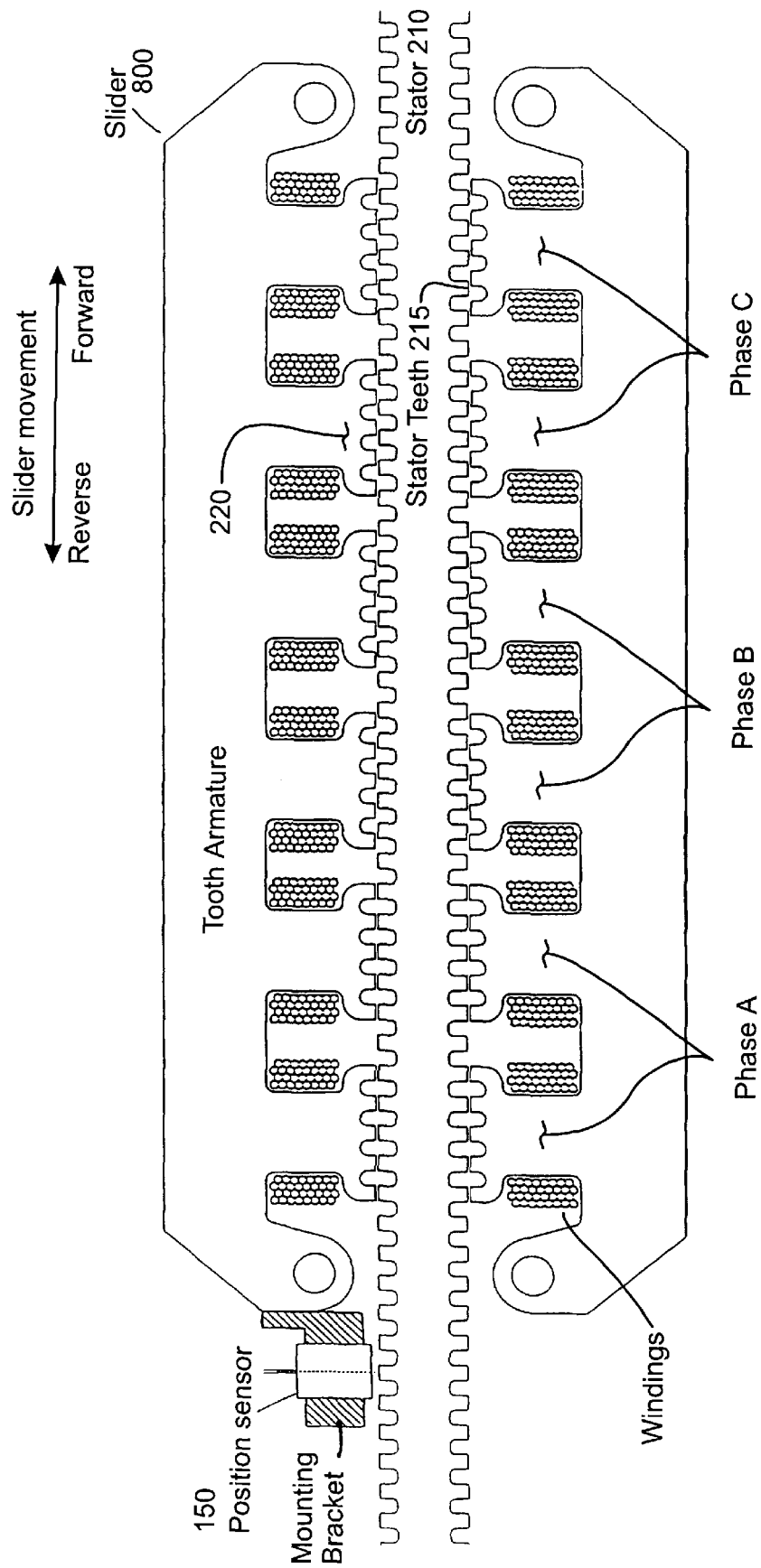
FIG. 8 is a diagram of a linear three-phase switched reluctance uncoupled motor with one position sensor, illustrating the relative placement of the position sensor with respect to the stator and armature teeth for phase A braking.

FIGS. 8, 9, and 10 show different embodiments of this invention as it applies to different motor types. The same method of applying an electromotive force to stop motor motion is present.

FIG. 8 is a cut-away illustration of a three-phase linear switched reluctance uncoupled motor with a single position sensor. The position sensor 150 and the phase A, B, and C windings are analogous to those described in FIG. 2. Each phase comprises two pair of windings wound on opposite sides of the stator 210. The slider 800 which houses the windings and toothed armature 220 moves linearly along the stator 210 in the forward and reverse directions. Position sensor 150 location and operation is similar to that described in FIG. 2.

FIG. 9 is a cut-away illustration of a three-phase rotary switched reluctance motor with a single position sensor 150. The depicted motor has one tooth per phase for simplicity and the position sensor 150 is mounted on the stator 910 in proximity to the rotor 970 teeth. In order to achieve efficient braking the position sensor 150 corresponding to the phase used in braking is activated only when the electromotive force is opposite to the direction of rotation. In order to achieve this the center of the position sensor 150 must be positioned at the center of the tooth on the rotor when the stator tooth of the controlled phase is aligned with the rotor tooth. Therefore, only phase A is energized to apply a braking force to the rotor. Similar to the discussion of FIG. 1, the single position sensor 150 and sensor circuitry, not shown, provide the correct time and duration to provide a current to the phase A winding.

FIG. 10 is a cut-away illustration of a three-phase rotary switched reluctance motor with three position sensors 150A, 150B, 150C. Similar to the discussion of FIG. 6, the sensor circuitry, not shown, provides a current for each of the three phases independently in a sensor coordinated manner to provide an electromotive braking force to the rotor teeth. The 60 degree angular separation of the position sensors provides the correct separation analogous to the ⅓ tooth pitch position sensor spacing shown in FIG. 7.

The above description provides a basic description of the operation of the braking apparatus. Numerous variations are appropriate to achieve variations in performance, reliability, size, weight, required power, ease of manufacturing, cost, and other design features. Moreover, with experimentation, different orientations, and relative geometries may better suit other specific applications. Other embodiments and applications of the present invention may come to mind by reading the above description of the present invention. Whenever a patent application or patent is referenced herein, it should be deemed to be incorporated by reference as to subject matter included therein. Moreover, the scope of the present invention should only be deemed to be limited by the claims that follow.

I claim:

1. An apparatus for braking either a linear or rotary electric motor having no permanent magnets and having either a stator or a rotor with equally spaced teeth comprising:

a motion controller;

at least one position sensor in relationship to said teeth with an electrical characteristic representative of motor position; and an electronic circuit, responsive to an emergency signal and responsive to said position sensor, for outputting a control signal for controlling the braking of said electric motor, said electronic circuit comprising a relay configured to connect said electronic circuit to a stored energy source, wherein said electronic circuit, said control signal, and said stored energy source operate independently of said motion controller.

2. The apparatus for braking an electric motor according to claim 1 wherein said electrical characteristic of said position sensor is variable resistance representative of motor position.

3. The apparatus for braking an electric motor according to claim 2 wherein said position sensor comprises a magnetoresistor.

4. The apparatus for braking an electric motor according to claim 1 wherein said motor comprises a motor having a plurality of phases, and wherein said electronic circuit is responsive to at least one of said position sensors for braking said motor by controlling at least one of said phases.

5. The apparatus for braking an electric motor according to claim 1 wherein said motor comprises a motor having a plurality of phases and wherein said electronic circuit is responsive to N of said position sensors for braking said motor by controlling N of said phases.

6. The apparatus for braking an electric motor according to claim 1, wherein said electronic circuit is responsive to a power emergency to the apparatus, and wherein said electronic circuit is configured to connect said control signal to at least one servo amplifier.

7. The apparatus for braking an electric motor according to claim 1, wherein said electronic circuit is responsive to a limit switch defining an emergency position of a driven member, and wherein said electronic circuit is configured to connect said control signal to at least one servo amplifier.

8. The apparatus for braking an electric motor according to claim 1, wherein said electronic circuit is responsive to a motion controller emergency, and wherein said electronic circuit is configured to connect said control signal to at least one servo amplifier.

9. The apparatus for braking an electric motor according to claim 1 wherein said stored energy source comprises a source of direct current voltage coupled to said electronic circuit.

10. The apparatus for braking an electric motor according to claim 9 wherein said source of direct current voltage comprises a capacitor, wherein said capacitor is configured to be charged by rectifying an alternating current voltage.

11. A method for braking of an electric motor comprising:
sensing relative motor position continuously;
receiving an emergency signal;
transferring motor control to an electronic circuit responsive to the receipt of said emergency signal for braking said electric motor wherein said electronic circuit is connected to a stored energy source; and
generating a braking control signal at times and for durations responsive to said relative motor position consistent with the braking of said electric motor to brake said electric motor to substantially a rest position.

12. The method for braking an electric motor according to claim 11 wherein said emergency signal is an undesirable condition.

13. The method for braking an electric motor according to claim 11 wherein said stored energy source comprising a capacitor with line power for charging said capacitor with sufficient charge to power said electronic circuit for stopping said motor.

14. The method for braking an electric motor according to claim 11 wherein said braking control signal controls at least one phase of a multi-phase motor.

15. An apparatus configured to brake either a linear or rotary electric motor having no permanent magnets and having either a stator or a rotor with equally spaced teeth, said motor including a motion controller and a position sensor, said apparatus comprising:
a circuit connected to said motion controller and connected to said position sensor, said circuit configured to derive power independently from said motion controller, said circuit configured to prevent said motion controller from controlling said motor in response to an emergency signal indicative of an emergency condition, and said circuit further configured to control said motor in response to said emergency signal.

16. The apparatus of claim 15, wherein said circuit comprises a relay, said relay being responsive to said emergency signal.

17. The apparatus of claim 15 including a servo amplifier connected to said circuit.

18. The apparatus of claim 15 including a stored direct-current energy source, wherein said circuit is configured to derive power from said stored direct-current energy source.

19. The apparatus of claim 15 wherein said position sensor disposed in such a relationship to said teeth so as to generate a position signal representative of motor position, wherein said circuit is responsive to said position signal.

* * * * *